US010323495B2

(12) United States Patent
Valencia et al.

(10) Patent No.: US 10,323,495 B2
(45) Date of Patent: Jun. 18, 2019

(54) SELF-SOURCED RESERVOIR FLUID FOR ENHANCED OIL RECOVERY

(71) Applicants: Jaime A. Valencia, Houston, TX (US); David W. Maher, Spring, TX (US); Robert D. Denton, Bellaire, TX (US); Gary F. Teletzke, Spring, TX (US); Michael W. Lin, Bellaire, TX (US)

(72) Inventors: Jaime A. Valencia, Houston, TX (US); David W. Maher, Spring, TX (US); Robert D. Denton, Bellaire, TX (US); Gary F. Teletzke, Spring, TX (US); Michael W. Lin, Bellaire, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 236 days.

(21) Appl. No.: 15/454,696

(22) Filed: Mar. 9, 2017

(65) Prior Publication Data
US 2017/0283688 A1 Oct. 5, 2017

Related U.S. Application Data

(60) Provisional application No. 62/315,288, filed on Mar. 30, 2016.

(51) Int. Cl.
E21B 43/40 (2006.01)
E21B 43/16 (2006.01)
(Continued)

(52) U.S. Cl.
CPC .............. E21B 43/40 (2013.01); C09K 8/58 (2013.01); C09K 8/594 (2013.01); C10G 7/00 (2013.01); E21B 43/166 (2013.01); E21B 43/168 (2013.01)

(58) Field of Classification Search
CPC .. C09K 8/594; C09K 8/58; C10G 7/00; E21B 43/40; E21B 43/168; E21B 43/16; E21B 43/166
See application file for complete search history.

(56) References Cited

U.S. PATENT DOCUMENTS 2,621,216 A 12/1952 White
2,843,219 A 7/1958 Habgood
(Continued)

FOREIGN PATENT DOCUMENTS

CA 2243105 A1 8/1999
DE 3 149 847 7/1983
(Continued)

OTHER PUBLICATIONS

Aaron, D. et al. (2005) "Separation of $CO_2$ from Flue Gas: A Review," *Separation Science and Technology*, 40, pp. 321-348.
(Continued)

*Primary Examiner* — Michael R Wills, III
(74) *Attorney, Agent, or Firm* — ExxonMobil Upstream Research Company—Law Department

(57) ABSTRACT

Disclosed techniques include a method of obtaining an enhanced oil recovery fluid from a hydrocarbon reservoir, comprising producing a hydrocarbon stream from the hydrocarbon reservoir, separating an associated gas stream from the hydrocarbon stream, and condensing at least a portion of the associated gas stream to obtain an enriched hydrocarbon fluid suitable for injecting into a liquid layer of the hydrocarbon reservoir to enhance recovery of hydrocarbons from the hydrocarbon reservoir.

17 Claims, 1 Drawing Sheet

(51) Int. Cl.
  *C09K 8/594* (2006.01)
  *C09K 8/58* (2006.01)
  *C01G 7/00* (2006.01)
  *C10G 7/00* (2006.01)

(56) References Cited

U.S. PATENT DOCUMENTS

| | | |
|---|---|---|
| 2,863,527 A | 12/1958 | Herbert |
| 2,960,837 A | 11/1960 | Swenson et al. |
| 3,050,950 A | 8/1962 | Karwat et al. |
| 3,109,726 A | 11/1963 | Karwat |
| 3,223,157 A | 12/1965 | Lacey et al. |
| 3,349,571 A | 10/1967 | Nebgen |
| 3,393,527 A | 7/1968 | Swensen et al. |
| 3,400,512 A | 9/1968 | McKay |
| 3,421,984 A | 1/1969 | Jensen et al. |
| 3,683,634 A | 8/1972 | Streich |
| 3,705,625 A | 12/1972 | Whitten et al. |
| 3,767,766 A | 10/1973 | Tjoa et al. |
| 3,824,080 A | 7/1974 | Smith et al. |
| 3,842,615 A | 10/1974 | Reigel et al. |
| 3,848,427 A | 11/1974 | Loofbourow |
| 3,895,101 A | 7/1975 | Tsuruta |
| 3,929,635 A | 12/1975 | Buriks et al. |
| 3,933,001 A | 1/1976 | Muska |
| 4,129,626 A | 12/1978 | Mellbom |
| 4,246,015 A | 1/1981 | Styring |
| 4,270,937 A | 6/1981 | Adler |
| 4,280,559 A | 7/1981 | Best |
| 4,281,518 A | 8/1981 | Muller et al. |
| 4,318,723 A | 3/1982 | Holmes et al. |
| 4,319,964 A | 3/1982 | Katz et al. |
| 4,336,233 A | 6/1982 | Appl et al. |
| 4,344,485 A | 8/1982 | Butler |
| 4,370,156 A | 1/1983 | Goddin et al. |
| 4,382,912 A | 5/1983 | Madgavkar et al. |
| 4,383,841 A | 5/1983 | Ryan et al. |
| 4,405,585 A | 9/1983 | Sartori et al. |
| 4,417,449 A | 11/1983 | Hegarty et al. |
| 4,417,909 A | 11/1983 | Weltmer |
| 4,421,535 A | 12/1983 | Mehra |
| 4,441,900 A | 4/1984 | Swallow |
| 4,459,142 A | 7/1984 | Goddin |
| 4,462,814 A | 7/1984 | Holmes et al. |
| 4,466,946 A | 8/1984 | Goddin et al. |
| 4,511,382 A | 4/1985 | Valencia et al. |
| 4,512,400 A | 4/1985 | Simon |
| 4,512,782 A | 4/1985 | Bauer et al. |
| 4,533,372 A | 8/1985 | Valencia et al. |
| 4,551,158 A | 11/1985 | Wagner et al. |
| 4,563,202 A | 1/1986 | Yao et al. |
| 4,592,766 A | 6/1986 | Kumman et al. |
| 4,602,477 A | 7/1986 | Lucadamo |
| 4,609,388 A | 9/1986 | Adler et al. |
| 4,636,334 A | 1/1987 | Skinner et al. |
| 4,695,672 A | 9/1987 | Bunting |
| 4,697,642 A | 10/1987 | Vogel |
| 4,710,213 A | 12/1987 | Sapper et al. |
| 4,717,408 A | 1/1988 | Hopewell |
| 4,720,294 A | 1/1988 | Lucadamo et al. |
| 4,747,858 A | 5/1988 | Gottier |
| 4,753,666 A | 6/1988 | Pastor et al. |
| 4,761,167 A | 8/1988 | Nicholas et al. |
| 4,762,543 A | 8/1988 | Pantermuehl et al. |
| 4,769,054 A | 9/1988 | Steigman |
| 4,822,393 A | 4/1989 | Markbreiter et al. |
| 4,831,206 A | 5/1989 | Zarchy |
| 4,923,493 A | 5/1990 | Valencia et al. |
| 4,927,498 A | 5/1990 | Rushmere |
| 4,935,043 A | 6/1990 | Blanc et al. |
| 4,954,220 A | 9/1990 | Rushmere |
| 4,972,676 A | 11/1990 | Sakai |
| 4,976,849 A | 12/1990 | Soldati |
| 5,011,521 A | 4/1991 | Gottier |
| 5,062,270 A | 11/1991 | Haut et al. |
| 5,120,338 A | 6/1992 | Potts et al. |
| 5,137,550 A | 8/1992 | Hegarty et al. |
| 5,152,927 A | 10/1992 | Rivers |
| 5,233,837 A | 8/1993 | Callahan |
| 5,240,472 A | 8/1993 | Sircar |
| 5,247,087 A | 9/1993 | Rivers |
| 5,265,428 A | 11/1993 | Valencia et al. |
| 5,335,504 A | 8/1994 | Durr et al. |
| 5,345,771 A | 9/1994 | Dinsmore |
| 5,567,396 A | 10/1996 | Perry et al. |
| 5,620,144 A | 4/1997 | Strock et al. |
| 5,643,460 A | 7/1997 | Marble et al. |
| 5,700,311 A | 12/1997 | Spencer |
| 5,720,929 A | 2/1998 | Minkkinen et al. |
| 5,819,555 A | 10/1998 | Engdahl |
| 5,820,837 A | 10/1998 | Marjanovich et al. |
| 5,899,274 A | 5/1999 | Frauenfeld et al. |
| 5,956,971 A | 9/1999 | Cole et al. |
| 5,964,985 A | 10/1999 | Wootten |
| 5,983,663 A | 11/1999 | Sterner |
| 6,053,007 A | 4/2000 | Victory et al. |
| 6,053,484 A | 4/2000 | Fan et al. |
| 6,082,133 A | 7/2000 | Barclay et al. |
| 6,082,373 A | 7/2000 | Sakurai et al. |
| 6,162,262 A | 12/2000 | Minkkinen et al. |
| 6,223,557 B1 | 5/2001 | Cole |
| 6,240,744 B1 | 6/2001 | Agrawal et al. |
| 6,267,358 B1 | 7/2001 | Gohara et al. |
| 6,270,557 B1 | 8/2001 | Millet et al. |
| 6,274,112 B1 | 8/2001 | Moffett et al. |
| 6,336,334 B1 | 1/2002 | Minkkinen et al. |
| 6,374,634 B2 | 4/2002 | Gallarda et al. |
| 6,401,486 B1 | 6/2002 | Lee et al. |
| 6,416,729 B1 | 7/2002 | DeBerry et al. |
| 6,442,969 B1 | 9/2002 | Rojey et al. |
| 6,500,982 B1 | 12/2002 | Hale et al. |
| 6,505,683 B2 | 1/2003 | Minkkinen et al. |
| 6,516,631 B1 | 2/2003 | Trebble |
| 6,517,801 B2 | 2/2003 | Watson et al. |
| 6,539,747 B2 | 4/2003 | Minta et al. |
| 6,565,629 B1 | 5/2003 | Hayashida et al. |
| 6,605,138 B2 | 8/2003 | Frondorf |
| 6,631,626 B1 | 10/2003 | Hahn |
| 6,632,266 B2 | 10/2003 | Thomas et al. |
| 6,662,872 B2 | 12/2003 | Gutek et al. |
| 6,708,759 B2 | 3/2004 | Leaute et al. |
| 6,711,914 B2 | 3/2004 | Lecomte |
| 6,735,979 B2 | 5/2004 | Lecomte et al. |
| 6,755,251 B2 | 6/2004 | Thomas et al. |
| 6,755,965 B2 | 6/2004 | Pironti et al. |
| 6,818,194 B2 | 11/2004 | DeBerry et al. |
| 6,883,327 B2 | 4/2005 | Iijima et al. |
| 6,946,017 B2 | 9/2005 | Leppin et al. |
| 6,958,111 B2 | 10/2005 | Rust et al. |
| 6,962,061 B2 | 11/2005 | Wilding et al. |
| 7,001,490 B2 | 2/2006 | Wostbrock et al. |
| 7,004,985 B2 | 2/2006 | Wallace et al. |
| 7,066,986 B2 | 6/2006 | Haben et al. |
| 7,073,348 B2 | 7/2006 | Clodic et al. |
| 7,121,115 B2 | 10/2006 | Lemaire et al. |
| 7,128,150 B2 | 10/2006 | Thomas et al. |
| 7,128,276 B2 | 10/2006 | Nilsen et al. |
| 7,152,431 B2 | 12/2006 | Amin et al. |
| 7,211,128 B2 | 5/2007 | Thomas et al. |
| 7,211,701 B2 | 5/2007 | Muller et al. |
| 7,219,512 B1 | 5/2007 | Wilding et al. |
| 7,285,225 B2 | 10/2007 | Copeland et al. |
| 7,325,415 B2 | 2/2008 | Amin et al. |
| 7,424,808 B2 | 9/2008 | Mak |
| 7,437,889 B2 | 10/2008 | Roberts et al. |
| 7,442,231 B2 | 10/2008 | Landrum |
| 7,442,233 B2 | 10/2008 | Mitariten |
| 7,493,779 B2 | 2/2009 | Amin |
| 7,536,873 B2 | 5/2009 | Nohlen |
| 7,550,064 B2 | 6/2009 | Bassler et al. |
| 7,575,624 B2 | 8/2009 | Cartwright et al. |
| 7,597,746 B2 | 10/2009 | Mak et al. |
| 7,635,408 B2 | 12/2009 | Mak et al. |
| 7,637,984 B2 | 12/2009 | Adamopoulos |

(56) References Cited

U.S. PATENT DOCUMENTS

| | | |
|---|---|---|
| 7,637,987 B2 | 12/2009 | Mak |
| 7,641,717 B2 | 1/2010 | Gal |
| 7,662,215 B2 | 2/2010 | Sparling et al. |
| 7,691,239 B2 | 4/2010 | Kister et al. |
| 7,722,289 B2 | 5/2010 | Leone et al. |
| 7,729,976 B2 | 6/2010 | Hill et al. |
| 7,770,872 B2 | 8/2010 | Delatour |
| 7,795,483 B2 | 9/2010 | Kulprathipanja et al. |
| 7,806,965 B2 | 10/2010 | Stinson |
| 7,814,975 B2 | 10/2010 | Hagen et al. |
| 7,879,135 B2 | 2/2011 | Ravikumar |
| 7,901,583 B2 | 3/2011 | McColl et al. |
| 7,955,496 B2 | 6/2011 | Iqbal et al. |
| 8,002,498 B2 | 8/2011 | Leone et al. |
| 8,020,408 B2 | 9/2011 | Howard et al. |
| 8,133,764 B2 | 3/2012 | Dirks et al. |
| 8,136,799 B2 | 3/2012 | Griepsma |
| 8,303,685 B2 | 11/2012 | Schubert et al. |
| 8,308,849 B2 | 11/2012 | Gal |
| 8,312,738 B2 | 11/2012 | Singh et al. |
| 8,372,169 B2 | 2/2013 | Tsangaris et al. |
| 8,381,544 B2 | 2/2013 | Coyle |
| 8,388,832 B2 | 3/2013 | Moffett et al. |
| 8,428,835 B2 | 4/2013 | Habert et al. |
| 8,475,572 B2 | 7/2013 | Prast et al. |
| 8,500,105 B2 | 8/2013 | Nieuwoudt |
| 8,529,662 B2 | 9/2013 | Kelley et al. |
| 9,255,731 B2 * | 2/2016 | Prim ............... F25J 3/067 |
| 2002/0174687 A1 | 11/2002 | Cai |
| 2002/0189443 A1 | 12/2002 | McGuire |
| 2003/0181772 A1 | 9/2003 | Meyer et al. |
| 2006/0207946 A1 | 9/2006 | McColl et al. |
| 2006/0239879 A1 | 10/2006 | Lallemand et al. |
| 2007/0056317 A1 | 3/2007 | Amin et al. |
| 2007/0144943 A1 | 6/2007 | Lemaire et al. |
| 2007/0277674 A1 | 12/2007 | Hirano et al. |
| 2008/0034789 A1 * | 2/2008 | Fieler ............... C10L 3/10 62/623 |
| 2008/0091316 A1 | 4/2008 | Szczublewski |
| 2008/0092589 A1 | 4/2008 | Tranier et al. |
| 2008/0307827 A1 | 12/2008 | Hino et al. |
| 2009/0023605 A1 | 1/2009 | Lebl et al. |
| 2009/0220406 A1 | 9/2009 | Rahman |
| 2010/0011809 A1 | 1/2010 | Mak |
| 2010/0018248 A1 | 1/2010 | Fieler et al. |
| 2010/0024472 A1 | 2/2010 | Amin et al. |
| 2010/0064725 A1 | 3/2010 | Chieng et al. |
| 2010/0107687 A1 | 5/2010 | Andrian et al. |
| 2010/0132405 A1 | 6/2010 | Nilsen |
| 2010/0147022 A1 | 6/2010 | Hart et al. |
| 2010/0187181 A1 | 7/2010 | Sortwell |
| 2010/0310439 A1 | 12/2010 | Brok et al. |
| 2011/0088897 A1 * | 4/2011 | Raman ............ E21B 43/164 166/267 |
| 2011/0132034 A1 | 6/2011 | Beaumont et al. |
| 2011/0146978 A1 * | 6/2011 | Perlman ............ C01B 3/34 166/266 |
| 2011/0146979 A1 * | 6/2011 | Wallace ............ E21B 41/0064 166/266 |
| 2011/0154856 A1 | 6/2011 | Andrian et al. |
| 2011/0168019 A1 | 7/2011 | Northrop et al. |
| 2011/0192190 A1 | 8/2011 | Andrian et al. |
| 2011/0265512 A1 | 11/2011 | Bearden et al. |
| 2012/0006055 A1 | 1/2012 | Van Santen et al. |
| 2012/0031143 A1 | 2/2012 | Van Santem et al. |
| 2012/0031144 A1 | 2/2012 | Northrop et al. |
| 2012/0079852 A1 | 4/2012 | Northrop et al. |
| 2012/0125043 A1 | 5/2012 | Cullinane et al. |
| 2012/0204599 A1 | 8/2012 | Northrop et al. |
| 2012/0279728 A1 | 11/2012 | Northrop et al. |
| 2013/0032029 A1 | 2/2013 | Mak |
| 2013/0074541 A1 | 3/2013 | Kaminsky et al. |
| 2013/0098105 A1 | 4/2013 | Northrop |
| 2014/0034305 A1 | 2/2014 | Dawson et al. |
| 2014/0130498 A1 * | 5/2014 | Randolph ............ E21B 43/24 60/645 |
| 2014/0137599 A1 | 5/2014 | Oelfke et al. |
| 2015/0060075 A1 | 3/2015 | Blom et al. |
| 2015/0158796 A1 | 6/2015 | Valencia et al. |
| 2015/0159939 A1 | 6/2015 | Valencia et al. |
| 2015/0159940 A1 | 6/2015 | Valencia et al. |
| 2015/0159941 A1 | 6/2015 | Valencia et al. |
| 2015/0159942 A1 | 6/2015 | Valencia et al. |
| 2015/0159943 A1 | 6/2015 | Valencia et al. |
| 2015/0159944 A1 | 6/2015 | Valencia et al. |
| 2015/0159945 A1 | 6/2015 | Valencia et al. |
| 2015/0159946 A1 | 6/2015 | Valencia et al. |
| 2015/0159947 A1 | 6/2015 | Valencia et al. |
| 2015/0369023 A1 | 12/2015 | MacPhail et al. |

FOREIGN PATENT DOCUMENTS

| | | |
|---|---|---|
| EP | 0 133 208 | 2/1985 |
| EP | 0 508 244 | 10/1992 |
| EP | 1 338 557 | 3/2005 |
| FR | 2514071 | 4/1983 |
| GB | 1010403 | 11/1965 |
| WO | WO 2002/032536 | 4/2002 |
| WO | WO 2002/039038 | 5/2002 |
| WO | WO 2004/047956 | 6/2004 |
| WO | WO 2008/034789 | 3/2008 |
| WO | WO 2008/095258 | 8/2008 |
| WO | WO 2008/152030 | 12/2008 |
| WO | WO 2009/023605 | 2/2009 |
| WO | WO 2009/029353 | 3/2009 |
| WO | WO 2009/087206 | 7/2009 |
| WO | WO 2010/023238 | 3/2010 |
| WO | WO 2010/052299 | 5/2010 |
| WO | WO 2010/136442 | 12/2010 |
| WO | WO 2011/026170 | 3/2011 |
| WO | WO 2011/041086 | 4/2011 |
| WO | WO 2013/095828 | 6/2013 |
| WO | WO 2013/142100 | 9/2013 |

OTHER PUBLICATIONS

Amin, R. (2003) "Advanced Mini Natural Gas Liquefier," *LNG Journal*, Mar.-Apr. 2003, pp. 20-23.

Black, S. (2006) "Chilled Ammonia Process for CO2 Capture," *Alstom Position Paper*, Nov. 2006, 6 pgs.

Ciulla, Vincent (2007) "How the Engine Works," About.com, Mar. 21, 2007, [retrieved from the internet on Aug. 17, 2012]. <URL: http://autorepair.about.com/cs/generalInfo/a/aa060500a.html>.

"Cryogenics" *Science Clarified*, May 2, 2006 [retrieved from the internet on Aug. 17, 2012]. <URL: http://www.scienceclarified.com/Co-Di/Cryogenics.html>.

Denton, R. D. et al. (1985) "Integrated Low Temperature Processing of Sour Natural Gas," *Gas Processors Assoc.*, 64$^{th}$ Ann. Conv., pp. 92-96.

Guccione, E. (1963) "New Approach to Recovery of Helium from Natural Gas," Chem. Engr., Sep. 30, 1963, pp. 76-78.

Hassan, S. M. N. (2005) "Techno-Economic Study of $CO_2$ Capture Process for Cement Plants," *University of Waterloo—Thesis*.

Haut, R. C. et al. (1988) "Development and Application of the Controlled Freeze Zone Process," *SPE 17757*, SPE Gas Tech. Symp.—Dallas, TX, pp. 435-443.

Haut, R. C. et al. (1988) "Development and Application of the Controlled Freeze Zone Process," *OSEA 88197*, 7$^{th}$ Offshore So. East Asia Conf., Singapore, Feb. 1988, pp. 840-848.

Haut, R. C. et al. (1989) "Development and Application of the Controlled Freeze Zone Process," *SPE Production Engineering*, Aug. 1989, pp. 265-271.

Im, U. K. et al. (1971) "Heterogeneous Phase Behavior of Carbon Dioxide in n-Hexane and n-Heptane at Low Temperatures," *Jrnl. of Chem. Engineering Data*, v.16.4, pp. 412-415.

Mitariten, M. et al. (2007) "The Sorbead™ Quick-Cycle Process for Simultaneous Removal of Water, Heavy Hydrocarbons and Mercaptans from Natural Gas," *Laurance Reid Gas Conditioning Conf.*, Feb. 25-27, 2007.

(56) References Cited

OTHER PUBLICATIONS

Northrop, P. Scott et al. (2004) "Cryogenic Sour Gas Process Attractive for Acid Gas Injection Applications," *83$^{rd}$ Ann. Gas Processors Assoc. Convention*, New Orleans, LA., pp. 1-8 (XP007912217).

Pagcatipunan, C. et al. (2005) "Maximize the Performance of Spray Nozzle Systems," *CEP Magazine*, Dec. 2005, pp. 38-44.

Reyes, S. C. et al. (1997) "Frequency Modulation Methods for Diffusion and Adsorption Measurements in Porous Solids," *J. Phys. Chem. B*, v.101, pp. 614-622.

Rubin, E. S. et al. (2002) "A Technical, Economic and Environmental Assessment of Amine-based CO2 Capture Technology for Power Plant Greenhouse Gas Control," *U.S. Dept. of Energy*, Oct. 2002, DOE/DE-FC26-00NT40935, 26 pages.

Spero, C. (2007) "Callide Oxyfuel Project," *CS Energy*, cLET Seminar, Jul. 12, 2007, 9 pages.

Thomas, E. R. et al. (1987) "Conceptual Studies Using the Controlled Freeze Zone (CFZ) Process," *AIChE Summer Nat'l Mtg.*, Aug. 16-19, 1987.

Thomas, E. R. et al. (1988) "Conceptual Studies for $CO_2$/Natural Gas Separation Using the Control Freeze Zone (CFZ) Process," *Gas Separation and Purification*, v. 2, pp. 84-89.

Valencia, J. A. et al. (2008) "Controlled Freeze Zone™ Technology for Enabling Processing of High $CO_2$ and $H_2S$ Gas Reserves," SPE-IPTC 12708, Kuala Lumpur, IN, v.4.1, Jan. 2008, pp. 2358-2363.

Victory, D. J. et al. (1987) "The CFZ Process: Direct Methane-Carbon Dioxide Fractionation," *66$^{th}$ Ann. GPA Convention*, Mar. 16-18, Denver, CO.

Wilson, R.W. et al. (1968) "Helium: Its Extraction and Purification," *Journ. Petrol. Tech.*, v. 20, pp. 341-344.

\* cited by examiner

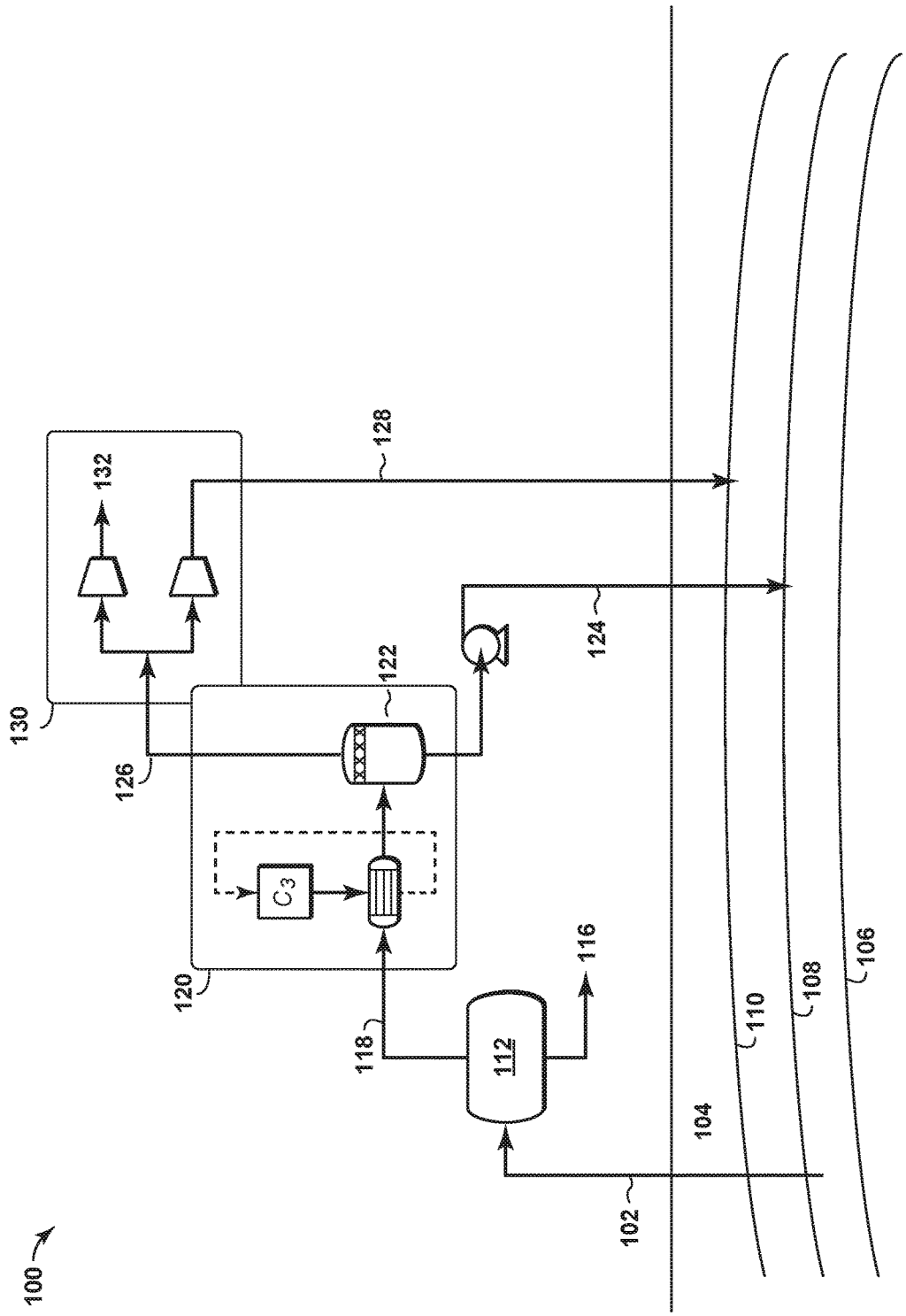

SELF-SOURCED RESERVOIR FLUID FOR ENHANCED OIL RECOVERY

CROSS REFERENCE TO RELATED APPLICATION

This application claims the benefit of U.S. Provisional Application Ser. No. 62/315,288 filed on Mar. 30, 2016, the entirety of which is incorporated by reference herein.

BACKGROUND

In the primary recovery of oil from a subterranean, oil-bearing formation or oil and gas reservoir, it is usually possible to recover only a limited proportion of the original oil present in the reservoir. For this reason, a variety of supplemental recovery techniques have been used to improve the displacement of oil from the reservoir rock. These techniques can be generally classified as thermally based recovery methods (such as steam flooding operations), water-flooding methods, and gas-drive based methods that can be operated under either miscible or immiscible conditions. These techniques are commonly categorized under the broad heading of enhanced oil recovery (EOR) techniques.

It may be desirable for gas-based EOR techniques that the EOR fluid and the oil are miscible under the conditions in the formation. In miscible flooding operations, an injection fluid or solvent is injected into the reservoir to form a single-phase solution with the oil in place so that the oil can then be removed as a more highly mobile phase from the reservoir. A fluid miscible with oil may enhance oil recovery by reducing or eliminating the interfacial tension between the oil and water thus improving oil displacement. The injection fluid may also enhance oil recovery, even if it does not form a single-phase solution with the oil, by swelling the oil, reducing viscosity, and/or vaporizing lighter components of the oil. The injection fluid may be a light hydrocarbon such as liquefied petroleum gas (LPG), a hydrocarbon gas containing relatively high concentrations of aliphatic hydrocarbons in the $C_2$ to $C_6$ range, nitrogen, and/or carbon dioxide. The injection fluid typically is a gas at atmospheric conditions, but becomes a dense fluid at reservoir conditions. Often, rail cars and/or truck transports are used to transport injection fluid to a well site for EOR operations, which can lead to increased costs and may prove challenging when access to the reservoir is restricted, e.g., by geography.

Various gas-based EOR flooding techniques known in the art include formulating particular mixtures of gases to increase the effectiveness of gas flooding operations. For example, U.S. Patent Application Publication No. 2015-0060075 discloses an EOR method that utilizes an ether-based injectant to mobilize oil within the hydrocarbon reservoir. Also, U.S. Pat. No. 4,512,400 discloses a method for upgrading natural gas to ethane, propane, and butane constituents using synthesis gas processing combined with the Fischer Tropsch process. The upgraded natural gas is then serially used in a multi-well miscible drive process. However, complicated techniques for formulating and/or synthesizing gas-based injection fluids can be expensive and/or time consuming, and may either require an amount of additional equipment that is infeasible for deployment to certain assets or may require sending products to a distant, centralized facility for processing.

Another supplemental recovery technique that has been used is to re-pressurize the formation. For example, in some circumstances, a portion of gas produced along with oil, so called "associated gas", may be reinjected back into a gas cap of the hydrocarbon reservoir for pressure maintenance. However, reinjection of associated gas becomes less viable over the lifetime of a hydrocarbon asset as an increasing amount of pressure is needed to maintain production from a decreasing amount of associated gas available.

As such, a need exists for a simple, energy efficient, and economic way of providing gas-based fluids for enhanced oil recovery.

SUMMARY

The disclosure includes a method of obtaining an enhanced oil recovery fluid from a hydrocarbon reservoir, such as a self-sourced reservoir fluid. The method may comprise producing a hydrocarbon stream from the hydrocarbon reservoir, separating an associated gas stream from the hydrocarbon stream, and condensing at least a portion of the associated gas stream to obtain an enriched hydrocarbon fluid suitable for injecting into a liquid layer, such as an oil layer, of the hydrocarbon reservoir to enhance recovery of hydrocarbons from the hydrocarbon reservoir. In some embodiments, condensing the associated gas stream comprises refrigerating the associated gas stream to obtain an enriched injectant fluid and a remaining gas stream, wherein the enriched injectant fluid stream comprises at least a minimum amount of $C_{2+}$ to function as an effective miscible enhanced oil recovery fluid, and wherein the remaining gas stream comprises primarily methane.

The disclosure further includes a system for obtaining an enhanced oil recovery fluid from a hydrocarbon reservoir. The system may comprise a wellhead operatively connected to the hydrocarbon reservoir, such as wellhead in fluid communication with the hydrocarbon reservoir, and an enrichment component operatively coupled to the wellhead, such as an enrichment component in fluid communication with the wellhead. The enrichment component may be configured to receive a hydrocarbon stream, separate an associated gas stream from the hydrocarbon stream, and condense at least a portion of the associated gas stream to obtain an enriched hydrocarbon fluid suitable for injecting into a liquid layer of the hydrocarbon reservoir to enhance recovery of hydrocarbons from the hydrocarbon reservoir.

BRIEF DESCRIPTION OF THE DRAWINGS

FIG. 1 is a schematic representation of a system for obtaining self-sourced reservoir fluid for EOR operations.

DETAILED DESCRIPTION

In the following detailed description, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described herein, but rather, include all alternatives, modifications, and equivalents falling within the true spirit and scope of the appended claims.

At the outset, for ease of reference, certain terms used in this application and their meanings as used in this context are set forth. To the extent a term used herein is not defined herein, it should be given the broadest definition persons in the pertinent art have given that term as reflected in at least one printed publication or issued patent. Further, the present techniques are not limited by the usage of the terms shown herein, as all equivalents, synonyms, new developments, and terms or techniques that serve the same or a similar purpose are considered to be within the scope of the present claims.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

As used herein, the terms "a" and "an," mean one or more when applied to any feature in embodiments of the present inventions described in the specification and claims. The use of "a" and "an" does not limit the meaning to a single feature unless such a limit is specifically stated.

As used herein, the term "about" is intended to allow some leeway in mathematical exactness to account for tolerances that are acceptable in the trade. Accordingly, any deviations upward or downward from the value modified by the term "about" in the range of 1% to 10% or less should be considered to be explicitly within the scope of the stated value.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that are recited as being adapted to perform a particular function may additionally or alternatively be described as being configured to perform that function, and vice versa.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

Unless the context indicates otherwise, all percentages used herein are mole %. Thus, for example, when the hydrocarbon fluid stream is referred to as containing greater than 55% $C_{2+}$ this indicates the hydrocarbon fluid stream comprises at least 55 mole % of $C_{2+}$ hydrocarbons.

As used herein, the term "fluid" refers to a substance that continually deforms under an applied shear stress. Fluids may include liquids, gases, combinations of gases and liquids, and combinations of liquids and solids.

As used herein, the term "higher hydrocarbons" and/or "$C_{2+}$" refers to hydrocarbon(s) having more than one carbon atom per molecule, e.g., ethane, propane, butanes, etc.

As used herein, the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur. Hydrocarbons generally fall into two classes: aliphatic, or straight chain hydrocarbons, and cyclic, or closed ring hydrocarbons, including cyclic terpenes. Examples of hydrocarbon-containing materials include any form of natural gas, oil, coal, and bitumen.

As used herein, the term "hydrocarbon stream" refers to a hydrocarbon or mixtures of hydrocarbons that are gases or liquids. For example, hydrocarbon streams or hydrocarbon fluids may include a hydrocarbon or mixtures of hydrocarbons that are gases or liquids at formation conditions, at processing conditions, or at ambient conditions (e.g., 15° C. and 1 atm pressure). Hydrocarbon streams and hydrocarbon fluids may include, for example, oil, natural gas, coalbed methane, shale oil, pyrolysis oil, pyrolysis gas, a pyrolysis product of coal, and other hydrocarbons that are in a gaseous or liquid state.

As used herein, the term "light hydrocarbons" refer to hydrocarbons having carbon numbers in a range from 1 to 5.

As used herein, the term "natural gas" refers to a multi-component gas obtained from a crude oil well (associated gas) or from a subterranean gas-bearing formation (non-associated gas). The composition and pressure of natural gas can vary significantly. A typical natural gas stream contains methane ($C_1$) as a significant component. Raw natural gas may also contain ethane ($C_2$), higher molecular weight hydrocarbons, acid gases (such as carbon dioxide, hydrogen sulfide, carbonyl sulfide, carbon disulfide, and/or mercaptans), and minor amounts of contaminants such as water, nitrogen, iron sulfide, wax, and/or crude oil. As used herein, natural gas includes gas resulting from the regasification of a liquefied natural gas, which has been purified to remove contaminates, such as water, acid gases, and most of the higher molecular weight hydrocarbons.

As used herein, the term "oil and gas reservoir" refers to a well or reservoir that is a subsurface zone that produces oil and/or gas and lacks communication with other reservoirs.

As used herein, the term "operatively coupled" means that the identified components are connected in a way to perform a designated function.

As used herein, the term "proximate" means that two or more items are spatially close, without regard to whether the spatial relationship places one item underneath, over, or beside another item. Items of definite size and/or shape (e.g., physical components) can be proximate to one another and/or proximate to items that might be of indefinite size and/or shape (e.g., certain chemical reactions).

As used herein, the term "reservoir" refers to a formation or a portion of a formation that includes sufficient permeability and porosity to hold and transmit fluids, such as hydrocarbons or water.

As used herein, the definite article "the" preceding singular or plural nouns or noun phrases denotes a particular specified feature or particular specified features and may have a singular or plural connotation depending upon the context in which it is used.

The present disclosure includes techniques enabling a wide variety of oil fields to have their own source of miscible fluid and/or enriched hydrocarbon fluid for enhanced oil recovery (EOR) operations using the associated gas from the produced hydrocarbon stream. Associated gases that have sufficient ethane and/or higher hydrocarbon content can bring significant benefits as a source of EOR fluid. In some embodiments, this presumes that the produced hydrocarbon stream comprises enough higher hydrocarbons to yield a liquid stream. By self-sourcing enriched hydrocarbon fluids for EOR, the disclosed techniques enable the ability to increase oil production at little cost. For example, some embodiments may only require adding a simple propane refrigerated separation unit to a local facility in order to provide the EOR fluid. In addition to being more cost effective than other techniques (e.g., than those requiring transport of enriched hydrocarbon fluids, particularized solvent formulations, and/or processing at separate and/or distant facilities), the disclosed techniques may locally provide both an EOR fluid and pressure maintenance gas, may be more energy efficient for prolonged EOR operations, and may reduce or eliminate the problem of stranded natural gas resources. Furthermore, using enriched hydrocarbon flooding may provide significant benefits over leaner associated gas injection for pressure maintenance or for gas lift and, consequently, the disclosed techniques may have EOR efficacy benefits over prior techniques relying on gas reinjection.

The miscibility of the gas with oil in the formation may be determined by the pressure and temperature of the formation, the nature of the oil in the formation, and the components of the gas. Gases having components that are similar to the hydrocarbons in the formation are more likely to be miscible with the oil than gases that are less similar to the formation hydrocarbons. Higher formation pressure (e.g. formations with a pressure greater than 3000 pounds per square inch absolute (psia) (20.7 megapascals (MPa)), or greater than 4000 psia (27.6 MPa), or greater than 5000 psia (34.5 MPa), or greater than 6000 psia (41.4 MPa), or greater than 7000 psia (48.3 MPa), or greater than 7250 psia (50 MPa)) may also facilitate miscibility of the gas with the formation hydrocarbons, and therefore gases with relatively low miscibility in the oil at low pressures may be miscible in the formation hydrocarbons due to the pressure in the formation.

As discussed further below with reference to FIG. 1, a produced hydrocarbon stream containing a minimum amount of $C_{2+}$ can become an effective miscible EOR fluid. Enriching the $C_{2+}$ content of a natural gas hydrocarbon stream by reducing the presence of methane and lighter non-hydrocarbon components such that the $C_{2+}$ concentration becomes relatively larger, for example ⅔ or greater, may make such an enriched stream a good miscible injectant fluid for EOR purposes.

Disclosed techniques include an enriching step for producing a produced hydrocarbon stream by means of refrigeration that condenses $C_{2+}$ components in the associated gas while letting thru the lighter methane and more volatile gas components, such as helium and nitrogen. A refrigeration system of this kind might be a propane based refrigeration system operating, for example, at −30° F. The discharge of the chilled fluids can then be separated into a liquid stream (the desired miscible injectant fluid) and a vapor stream rich in methane that can be either sold as pipeline gas or reinjected in the reservoir for pressure maintenance.

As an additional benefit, the disclosed techniques utilize equipment with a relatively smaller capacity as compared to conventional processing facilities. Consequently, components may be standardized into truckable modules capable of deployment to remote, geographically challenging locations. Moreover, various embodiments of the disclosed approach may allow for reduced monitoring and/or maintenance.

FIG. 1 is a schematic representation of a system 100 for obtaining self-sourced reservoir fluid for EOR. Those of skill in the art will appreciate that the schematic of FIG. 1 is simplified and various components have been combined and/or omitted from FIG. 1 for ease of viewing, and that additional and/or alternate equipment configurations are suitably available for use with the disclosed approach. All such additional and/or alternate configurations are considered with the scope of this disclosure. The system 100 may be comprised within a facility located proximate to the hydrocarbon reservoir, e.g., at a wellhead. The system 100 utilizes a hydrocarbon stream 102 produced via a wellhead operatively coupled to a hydrocarbon reservoir 104. For example, the hydrocarbon stream 102 may be produced via a wellhead that is in fluid communication with the hydrocarbon reservoir 104. Hydrocarbon reservoirs generally include trapped oil and gas within rock formations and may include subsurface pools of hydrocarbons contained in porous sedimentary rock. A layer of impermeable rock formations, termed cap rock, may prevent the escape of the naturally occurring hydrocarbons into overlying sediment and rock formations (the overburden). Various recovery methods may be implemented to extract and recover both the oil and gas hydrocarbons. During recovery, the hydrocarbon reservoir may produce the crude oil and raw natural gas along with other liquid, gaseous, and/or solid hydrocarbons as hydrocarbon stream 102. The composition of the hydrocarbon stream 102 will vary depending on the hydrocarbon reservoir 104 characteristics. In some embodiments, the hydrocarbon stream 102 may comprise about 20-35% $C_{2+}$ hydrocarbons. The hydrocarbon reservoir 104 may have a water layer 106, a liquid and/or oil layer 108, and/or a gas cap 110.

The hydrocarbon stream 102 may pass to an oil/gas separation component 112, e.g., a gas-oil separator, for separation into a bottom stream 116 containing primarily saleable oil and an associated gas stream 118. The associated gas stream 118 in the embodiment of FIG. 1 may be at a pressure between X and Y, wherein X is 100 psia, 200 psia, 300 psia, 400 psia, 500 psia, or 600 psia and wherein Y is 1,000 psia, 900 psia, 800 psia, 700 psia, or 600 psia. In the embodiment of FIG. 1, the associated gas stream 118 is in the range of 500 psia to 700 psia, such as at 600 psia. The associated gas stream 118 in the embodiment of FIG. 1 may comprise at least about 10% $C_{2+}$, 20% $C_{2+}$, 30% $C_{2+}$, 40% $C_{2+}$, or more. In the embodiment of FIG. 1, the associated gas stream 118 comprises from about 15% $C_{2+}$ to about 25% $C_{2+}$, such as about 20% $C_{2+}$. The volume of the associated gas stream 118 in the embodiment of FIG. 1 may be between X and Y, wherein X is 5 thousand standard cubic feet per day (mscfd), 10 mscfd, 20 mscfd, 30 mscfd, 40 mscfd, or 50 mscfd, and wherein Y is 200 mscfd, 150 mscfd, or 100 mscfd. In the embodiment of FIG. 1, the associated gas stream 118 passes between 50 mscfd and 100 mscfd. Those of skill will appreciate that alternate embodiments may suitably utilize alternate and/or additional values in practicing the disclosed techniques, and such alternate embodiments are considered within the scope of this disclosure.

The associated gas stream 118 passes to an enrichment component 120. The enrichment component 120 may comprise a propane refrigeration unit configured to reduce the temperature of the associated gas stream 118 to between X and Y, wherein X is +50° Celsius (C.), +40° C., +30° C., +20° C., +10° C., 0° C., −10° C., −20° C., or −30° C., and wherein Y is −70° C., −60° C., −50° C., −40° C., or −30° C. In the embodiment of FIG. 1, the enrichment component 120 cools the associated gas stream 118 to between −20° C. and −40° C. Cooling the associated gas stream 118 by this amount may require that the enrichment component 120 be a refrigeration unit configured to reduce the temperature of the associated gas stream 118 by between 1° C. and 130° C. Some embodiments may produce the power for the enrichment component 120 locally, some embodiments may use off-site power, and still other embodiments may use a combination thereof.

Cooling the associated gas stream 118 may condense at least a portion of the associated gas stream 118 to obtain an enriched hydrocarbon fluid stream 124. Alternate embodiments may utilize a compression component as an enrichment component 120 rather than a refrigeration component in order to condense the portion of the associated gas stream 118. Still other embodiments may utilize a combination of compression and refrigeration steps. The enriched hydrocarbon fluid stream 124 may be suitable for injecting into the hydrocarbon reservoir 104, and may be, for example, injected into a liquid and/or oil layer 108 of the hydrocarbon reservoir 104, e.g., as a miscible flooding fluid. The enriched hydrocarbon fluid stream 124 in the embodiment of FIG. 1 may comprise at or above about 55% $C_{2+}$, 60% $C_{2+}$, 65% $C_{2+}$, 70% $C_{2+}$, or more. In the embodiment of FIG. 1, the enriched hydrocarbon fluid stream 124 comprises from about 60% $C_{2+}$ to about 70% $C_{2+}$, such as about 65% $C_{2+}$. The volume of the enriched hydrocarbon fluid stream 124 in the embodiment of FIG. 1 may be between X and Y, wherein X is 5 mscfd, 10 mscfd, 15 mscfd, 20 mscfd, or 25 mscfd, and wherein Y is 40 mscfd, 35 mscfd, or 30 mscfd. In the embodiment of FIG. 1, the enriched hydrocarbon fluid stream 124 passes between 15 mscfd and 30 mscfd.

The enrichment component 120 comprises a separator 122 configured to obtain an enriched hydrocarbon fluid stream 124 and obtain a lean gas (i.e., lacking higher hydrocarbons), a volatile gas, a remaining gas stream, and/or a methane-rich stream 126, e.g., by condensing at least a portion of the associated gas stream 118. The methane-rich stream 126 in the embodiment of FIG. 1 may comprise less than or equal to about 20% $C_{2+}$, 15% $C_{2+}$, 10% $C_{2+}$, or 5% $C_{2+}$. In the embodiment of FIG. 1, the methane-rich stream 126 comprises less than 10% $C_{2+}$. The volume of the methane-rich stream 126 in the embodiment of FIG. 1 may be between X and Y, wherein X is 5 mscfd, 10 mscfd, 20 mscfd, 30 mscfd, 40 mscfd, 50 mscfd, 60 mscfd, or 70 mscfd, and wherein Y is 150 mscfd, 125 mscfd, 100 mscfd, 80 mscfd, or 60 mscfd. In the embodiment of FIG. 1, the methane-rich stream 126 passes between 30 mscfd and 80 mscfd. The methane-rich stream 126 passes to a lean gas compression component 130 for processing and/or disposal. The lean gas compression unit 130 may pass at least a portion of the methane-rich stream 126 to a pipeline 132 for sale, to a pipeline 132 for use at a second hydrocarbon reservoir (e.g., for pressure maintenance, power, etc.), and/or may pass at least a portion of the methane-rich stream 126 to a reinjection line 128 operatively coupled to the hydrocarbon reservoir, e.g., for reinjection into the gas cap 110 for pressure maintenance. In embodiments that pass at least a portion of the methane-rich stream 126 to a pipeline for use at a second hydrocarbon reservoir, the second hydrocarbon reservoir may be located in a field proximate and/or adjacent to the first hydrocarbon reservoir. Using gas from a proximate and/or adjacent hydrocarbon reservoir for pressure maintenance may provide significant efficiencies over using gas from an alternate location. Those of skill in the art will appreciate that in embodiments that send at least a portion of the methane-rich stream 126 to a pipeline for sale, additional and/or alternate equipment may be required to ensure that the methane-rich stream 126 meets pipeline specifications, e.g., heating value, Wobbe index, etc.

Thus, as described herein are methods and systems for obtaining self-sourced enriched hydrocarbon fluids that are suitable for injecting into a hydrocarbon reservoir, such as a liquid layer of a hydrocarbon reservoir, to enhance recovery of hydrocarbons from the hydrocarbon reservoir. The methods may comprise producing a hydrocarbon stream from the hydrocarbon reservoir, separating an associated gas stream from the hydrocarbon stream, and condensing at least a portion of the associated gas stream to obtain an enriched hydrocarbon fluid. The method may also comprise separating a methane-rich stream from the associated gas stream. The method may further comprise injecting at least a portion of the enriched hydrocarbon fluid stream into the hydrocarbon reservoir, such as into a liquid layer of the hydrocarbon reservoir, such as an oil layer of the hydrocarbon reservoir.

In some embodiments, condensing the associated gas stream may comprise cooling by refrigerating the associated gas stream by at least 1° C. and up to by 130° C. In some embodiments, the associated gas stream may be cooled to a temperature that is in the range of from about +50° C. to about −70° C., or to a temperature as described further above with reference to FIG. 1.

Preferably, the enriched hydrocarbon stream comprises an amount of $C_{2+}$ hydrocarbons such that the enriched hydrocarbon stream is miscible with the oil in the hydrocarbon reservoir at the temperature and pressure conditions within the reservoir. For example, the amount of $C_{2+}$ hydrocarbons in the enriched hydrocarbon stream may be greater than 55 mole %, or greater than 60 mole %, or in an amount as described further above with reference to FIG. 1.

What is claimed is:

1. A method of obtaining an enhanced oil recovery fluid from a hydrocarbon reservoir, comprising:

producing a hydrocarbon stream from the hydrocarbon reservoir;

separating an associated gas stream from the hydrocarbon stream; and condensing at least a portion of the associated gas stream to obtain an enriched hydrocarbon fluid suitable for injecting into a liquid layer of the hydrocarbon reservoir to enhance recovery of hydrocarbons from the hydrocarbon reservoir, wherein condensing at least a portion of the associated gas stream comprises reducing the temperature of the associated gas stream by between 1° Celsius and 130° Celsius.

2. The method of claim 1, further comprising:

separating a methane-rich stream from the associated gas stream, wherein the methane-rich stream comprises substantially methane.

3. The method of claim 2, wherein the methane stream is in a gas phase.

4. The method of claim 1, wherein at least one of separating the associated gas stream from the hydrocarbon stream, and condensing at least a portion of the associated gas stream, occur at a facility located proximate to the hydrocarbon reservoir.

5. The method of claim 1, wherein the condensing step and the separating step occur at substantially the same time.

6. The method of claim 1, wherein the condensing at least a portion of the associated gas stream comprises reducing the temperature of the associated gas stream to a temperature between +50° Celsius and −70° Celsius.

7. A method of enhanced oil recovery using self-sourced reservoir fluids, comprising:

producing a hydrocarbon stream from a hydrocarbon reservoir;

separating an associated gas stream from the hydrocarbon stream;

refrigerating the associated gas stream to obtain a remaining gas stream and an enriched hydrocarbon fluid, wherein the remaining gas stream comprises primarily methane, wherein refrigerating comprises reducing the temperature of the associated gas stream by between 1° Celsius and 130° Celsius, and wherein the enriched hydrocarbon fluid stream comprises at least 55% $C_{2+}$ to thereby function as an effective miscible enhanced oil recovery fluid; and injecting at least a portion of the enriched hydrocarbon fluid stream into an oil layer of the hydrocarbon reservoir.

8. The method of claim 7, further comprising:

injecting at least a portion of the remaining gas stream into a gas cap of the hydrocarbon reservoir.

9. The method of claim 7, wherein the remaining gas stream comprise primarily methane, further comprising:

selling a primarily methane portion of the remaining stream at a market.

10. The method of claim 7, wherein at least one of the separating step, and the refrigerating step, occur at a facility located proximate to the hydrocarbon reservoir.

11. A system for obtaining an enhanced oil recovery fluid from a hydrocarbon reservoir, comprising:

a wellhead operatively connected to the hydrocarbon reservoir and configured to receive a hydrocarbon stream from the hydrocarbon reservoir; and an enrichment component operatively coupled to the wellhead, wherein the enrichment component is configured to:

receive the hydrocarbon stream;

separate an associated gas stream from the hydrocarbon stream; and condense at least a portion of the associated gas stream to obtain an enriched hydrocarbon fluid, wherein the enrichment component comprises a refrigeration portion configured to reduce the temperature of the associated gas stream by between 1° Celsius and 130° Celsius.

12. The system of claim 11, further comprising:

a reinjection line operatively coupled to the enrichment component and configured to pass the enriched hydrocarbon fluid to a miscible flooding component, wherein the miscible flooding component is configured to inject the enriched hydrocarbon fluid into an oil layer of the hydrocarbon reservoir.

13. The system of claim 11, further comprising:

a pipeline operatively coupled to the enrichment component and configured to pass a gas stream comprising substantially methane away from the hydrocarbon reservoir.

14. The system of claim 11, wherein the enrichment component is further configured to obtain a volatile gas stream from the associated gas stream, wherein the volatile gas stream comprises methane.

15. The system of claim 11, wherein the enriched hydrocarbon fluid comprises at least 60% $C_{2+}$.

16. The system of claim 11, further comprising:

a pipeline operatively coupled to the enrichment component and configured to pass the enriched hydrocarbon fluid to a second hydrocarbon reservoir.

17. The system of claim 11, wherein the enrichment component is proximate to the wellhead.

* * * * *